July 7, 1959  T. ERB  2,894,210
MAGNETIC COUPLED MULTIVIBRATOR
Filed Jan. 31, 1957
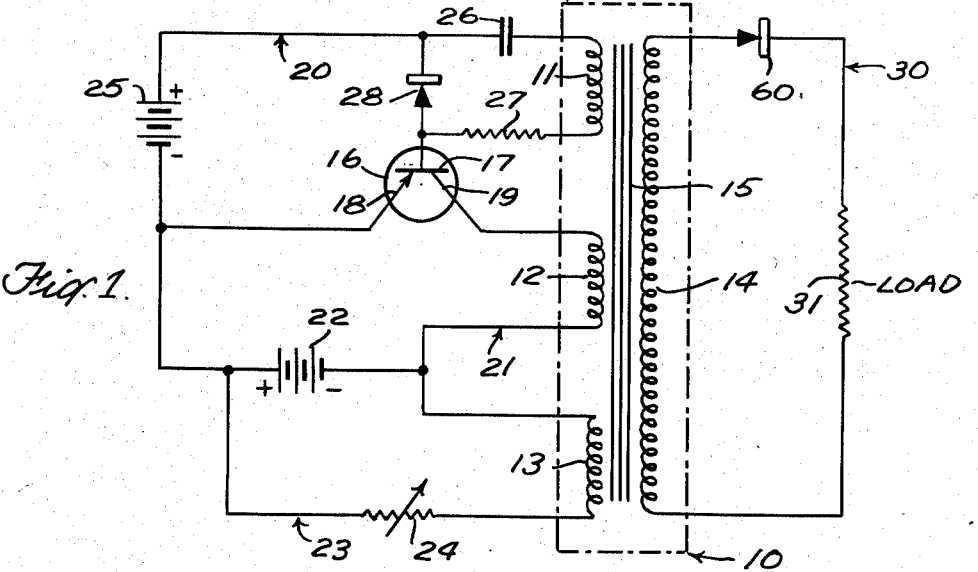
Fig. 1.
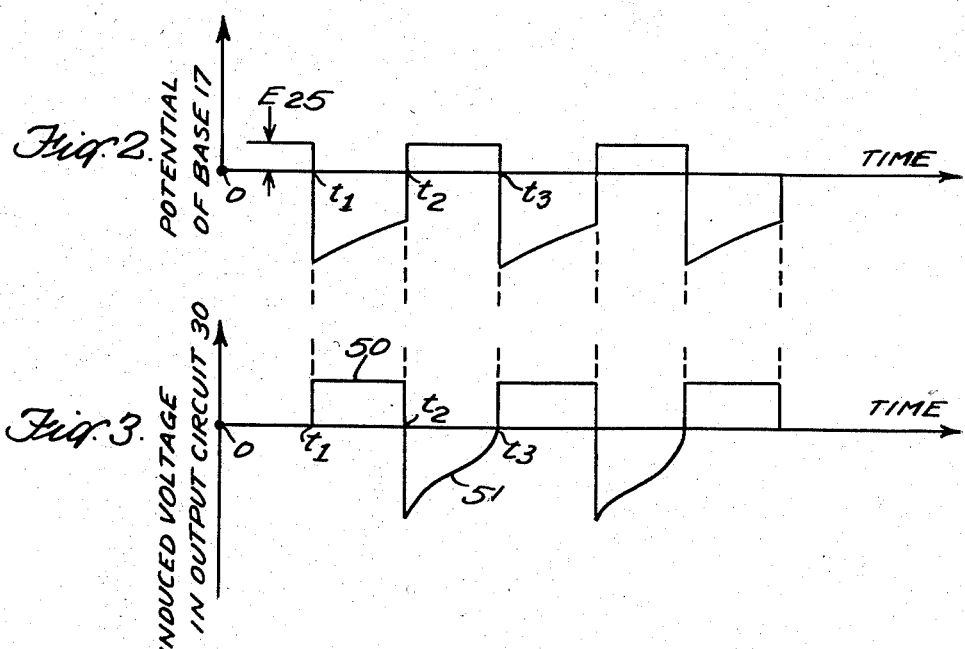
Fig. 2.
Fig. 3.
INVENTOR
THEODOR ERB
BY
ATTORNEY United States Patent Office 2,894,210
Patented July 7, 1959

2,894,210

MAGNETIC COUPLED MULTIVIBRATOR

Theodor Erb, Forest Hills, N.Y., assignor to Sperry Rand Corporation, Ford Instrument Company Division, Long Island City, N.Y., a corporation of Delaware Application January 31, 1957, Serial No. 637,382

6 Claims. (Cl. 331—113)

This invention relates to electronic pulse generators and particularly to improved magnetic coupled multivibrators.

As is well known to those skilled in the electronic art, free running multivibrators of various designs have been developed to deliver voltage and power pulses. One such design, known as the Royer circuit, employs two transistors and one saturable core and the frequency of this multivibrator is controlled by varying the power supply voltage or the windings on the saturable core. In another design, known as the Van Allen circuit, an additional saturable core is provided for controlling the frequency of the multivibrator by adjusting the control current in windings on the cores.

One object of the invention is to provide an improved magnetic coupled self-exciting multivibrator having a single transistor and saturable core.

Another object of the invention is to provide a self-exciting multivibrator with improved frequency control.

A further object of the invention is to provide an improved multivibrator which delivers unidirectional power pulses having substantially constant volt-time area.

In general the invention contemplates a self-exciting multivibrator having magnetic circuit control. The self-excitation of the device is produced by the recurring unidirectional charging of a condenser disposed in its input side, the charge being sufficient to remove the blocking bias voltage when the flux state in the magnetic circuit is stabilized.

These and other features, capabilities and advantages of the invention will appear from the detailed description of one embodiment thereof illustrated in the accompanying drawing in which:

Fig. 1 is a schematic diagram of an improved magnetic coupled multivibrator;

Fig. 2 is a diagram illustrating the time variation of the potential of the base electrode in the transistor of Fig. 1; and Fig. 3 is a diagram illustrating the time variation of the induced voltages in the output winding of Fig. 1.

Referring to Fig. 1, a saturable reactor 10 comprises a holding winding 11, a load winding 12, a reset winding 13 and an output winding 14 disposed on a saturable magnetic circuit 15. A transistor 16 having a base electrode 17, an emitter electrode 18 and a collector electrode 19 couples an input circuit 20 and a load circuit 21, the load circuit 21 comprising, in series connection, an emitter electrode 18, a collector electrode 19, the load coil 12 and a D.C. power source 22. A control circuit 23 is connected across the D.C. power source 22 and includes the reset winding 13 and a variable resistor 24. The input circuit 20 comprises, in series connection, a bias D.C. source 25, a condenser 26, the holding winding 11 and a current limiting resistor 27. These elements are coupled across the base 17 and emitter 18 of the transistor 16. Also, a diode 28 is connected and poled from the base electrode 17 to the positive terminal of the source 25. An output circuit 30 including a load resistor 31 is connected across output winding 14. Load winding 12 and reset winding 13 are poled to induce opposing fluxes in the magnetic circuit 15 by their respective currents.

Figs. 2 and 3 explain the manner of operation of the multivibrator schematically represented in Fig. 1. When a PNP type transistor is employed for element 16, the negative side of bias source 25 is connected to the emitter 18 for blocking the transistor with a positive potential on base electrode 17, while the negative side of power source 22 is connected to the collector electrode 19 for energizing the load winding 12.

Assuming that a transient at time instant $t_1$ in the input circuit 20 instantaneously causes the base electrode to have a negative potential as shown in Fig. 2, the transistor becomes unblocked and the load circuit 21 becomes more conductive than the control circuit 23. Hence the flux in the magnetic circuit 15 is driven towards positive saturation by the current in load winding 12 and a positive voltage pulse 50 is started in the output circuit as shown in Fig. 3. Holding winding 11 is poled so as to have induced therein by the increasing current in load winding 12, a voltage in opposition to, and of greater magnitude than, the voltage of bias source 25. Accordingly the potential of base element 17 is sustained at a negative value and the output voltage pulse is sustained for a time interval $t_1$ to $t_2$. When the magnetic circuit 15 becomes saturated at time instant $t_2$, the induced voltage in holding winding 11 disappears and the bias voltage of source 25 again causes the base electrode 17 to have a positive potential for blocking the load circuit 21. At this instant the current flowing through resistor 24 and winding 13 resets the magnetic circuit by driving it to negative saturation. While this occurs, the reversed induced voltage in holding winding 11 assists the blocked state of the transistor.

At the end of the resetting pulse corresponding to time instant $t_3$, a new triggering pulse is automatically generated in the input circuit 20 by the coaction of the condenser 26, the winding 11 and the diode 28. The diode is poled from the base 17 to the condenser 26 so that the voltage induced in winding 11 during the reset interval can charge the condenser 26 to a higher value than the voltage of the bias source 25. As the voltage induced in the winding 11 disappears, the resultant voltage in the input circuit 20 drives the potential of base 17 towards a negative value. At time instant $t_3$ the diode 28 prevents the discharge of condenser 26 through winding 11 and the base electrode 17 becomes negative for unblocking the transistor since the voltage across condenser 26 is greater than the bias voltage of source 25.

From the foregoing, it will be seen that repetitive pulses will be generated in the output circuit 30 as shown in Fig. 3. For this circuitry, the voltage-time area of the resetting pulse 51 is constant and equal to the voltage-time area of the positive pulse 50 in output circuit 30. As the average voltage of the resetting pulses is controlled by adjusting the variable resistor 24 in control circuit 23, the duration of the resetting pulse will shorten as the average resetting voltage is made greater, and vice versa. Hence, the frequency or the repetitive rate of the generated pulses is controlled by the variable resistor 24.

The schematic diagram in Fig. 1 indicates the proper battery polarities for type PNP transistor. However, a type NPP transistor may be used by merely reversing all battery polarities.

Other embodiments of the invention may employ other types of electronic conduction control devices such as vacuum tubes instead of the semi-conductor elements disclosed in Fig. 1. Also, when a selected type of junction silicon transistor having a low reverse voltage characteristic is used for element 16, the diode 28 may be omitted. Further with selective components, some specific designs can omit the bias voltage source 25. In still another embodiment, a non-linear network can replace the variable resistance 24 so as to provide output pulses having improved geometrical shape.

In the event that only unidirectional output pulses are desired, a diode 60 is inserted in series connection with the output circuit 30, the orientation of the diode 60 and the output winding 14 being selected to remove the negative pulses 51.

It is to be understood that various modifications of the invention other than those above described may be effected by persons skilled in the art without departing from the principle and scope of the invention as defined in the appended claims.

What is claimed is:

1. A multivibrator comprising an electronic conduction control device having a first, second and control electrode, an input circuit connected across the said first and said control electrodes, a magnetic circuit, a holding winding, a load winding, a reset winding and an output winding inductively disposed on said magnetic circuit, said input circuit including in series connection a condenser and said holding coil, a load circuit connected across said first and said second electrodes, said load circuit including in series connection a direct current source and said load winding, a control circuit connected across said direct current source and comprising a variable resistor in series connection with said reset winding, and an output circuit coupled across said output winding, the direct current source having a polarity to forward bias said first and said second electrodes, said load and said reset windings being poled to induce opposing fluxes in said magnetic circuit, said holding coil being poled to generate a voltage by the increasing flux of said load winding for forward biasing said first and said second electrodes.

2. A multivibrator as claimed in claim 1 wherein a second direct current source is included in said input circuit, said second direct current source having a polarity for reverse biasing said first and said control electrodes.

3. A multivibrator as claimed in claim 1 wherein a diode is connected in shunt relationship with the series connection of said condenser and said holding coil, said diode being poled to permit charging of said condenser as a result of a decreasing flux in the magnetic circuit.

4. A multivibrator as claimed in claim 3 wherein a fixed resistor is included in the said series connection of said condenser and said holding coil whereby said fixed resistor is in control of the rate of condenser charge.

5. A multivibrator as claimed in claim 1 wherein a second diode is included in said output circuit whereby the pulses in said output circuit are unidirectional.

6. A multivibrator as claimed in claim 1 wherein said electronic conduction control device is a transistor having an emitter, collector and base electrodes, said first, second and control electrodes being the emitter, collector and base electrodes, respectively, of said transistor.

References Cited in the file of this patent
UNITED STATES PATENTS
2,783,384   Bright et al. _____ Feb. 26, 1957